United States Patent [19]
Hardy et al.

[11] Patent Number: 4,697,764
[45] Date of Patent: Oct. 6, 1987

[54] AIRCRAFT AUTONOMOUS RECONFIGURABLE INTERNAL WEAPONS BAY FOR LOADING, CARRYING AND LAUNCHING DIFFERENT WEAPONS THEREFROM

[75] Inventors: Richard Hardy, Seattle; Frank D. Neumann, Bellevue; Geoffrey F. Sharples, Mercer Island, all of Wash.

[73] Assignee: The Boeing Company, Seattle, Wash.

[21] Appl. No.: 830,007

[22] Filed: Feb. 18, 1986

[51] Int. Cl.⁴ .................... B64D 1/06; B64D 7/08
[52] U.S. Cl. .................... 244/137.4; 89/1.51; 89/1.54; 89/1.59
[58] Field of Search ............ 244/137 R, 137 P, 118.1, 244/129.4; 89/1.51, 1.54, 1.58, 1.59, 1.815, 1.8

[56] References Cited
U.S. PATENT DOCUMENTS

| | | | |
|---|---|---|---|
| 2,362,345 | 11/1944 | Bertran | 89/1.54 |
| 2,412,729 | 12/1946 | Hall | 89/1.59 |
| 2,749,064 | 6/1956 | Kuhlman, Jr. | 244/137 R |
| 2,791,387 | 5/1957 | Weinberg | 244/137 R |
| 2,921,501 | 1/1960 | Parot | 244/137 A |
| 3,216,322 | 11/1965 | Wenger et al. | 244/137 A |
| 3,494,247 | 2/1970 | Dilworth, III et al. | 244/137 A |
| 3,969,977 | 7/1976 | Opdahl | 244/137 R |
| 4,520,975 | 6/1985 | Blackhurst | 244/137 A |

FOREIGN PATENT DOCUMENTS 744609  2/1956  United Kingdom ........... 244/137 A

*Primary Examiner*—Galen Barefoot
*Attorney, Agent, or Firm*—Seed and Berry

[57] ABSTRACT

An aircraft autonomous, reconfigurable internal weapons bay for launching different types of weapons such as air-to-air and air-to-ground missiles with folding or fixed fins. The weapons bay is characterized by having internally folding doors which provide separate shallow compartments. The individual compartments are adaptable for carrying a multitude of different types and sizes of missiles internally or semi-submerged.

9 Claims, 24 Drawing Figures

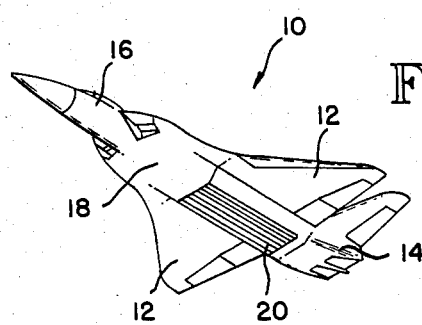
FIG. 1
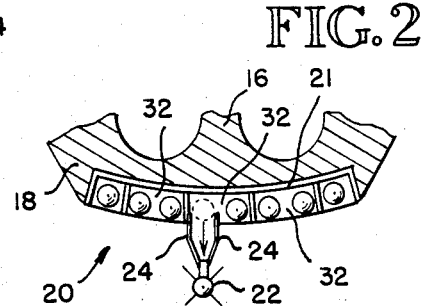
FIG. 2
FIG. 3
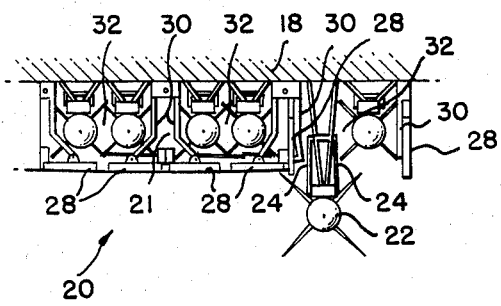
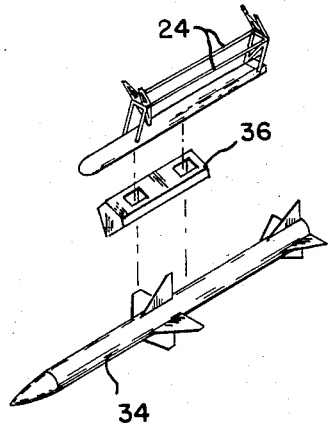
FIG. 4
FIG. 5A
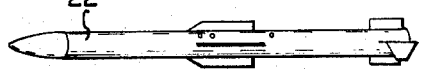
FIG. 5B
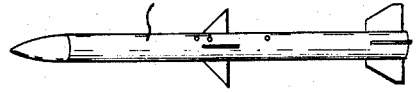
FIG. 5E
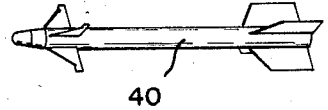
FIG. 5C
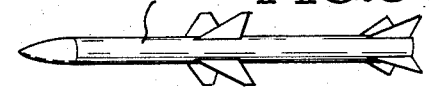
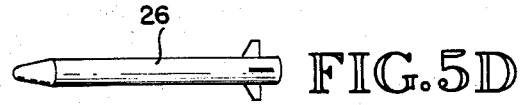
FIG. 5D
FIG. 5F
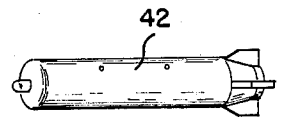

4,697,764

AIRCRAFT AUTONOMOUS RECONFIGURABLE INTERNAL WEAPONS BAY FOR LOADING, CARRYING AND LAUNCHING DIFFERENT WEAPONS THEREFROM

BACKGROUND OF THE INVENTION

This invention relates to an improved weapons bay for different types of military aircraft and, more particularly, but not by way of limitation, to an autonomous reconfigurable internal weapons bay which is quickly adaptable for carrying a variety of different types of weapons.

Heretofore there has been different types and sizes of weapon and bomb bays and pylons on military bombers and fighters. None of the prior art bays provide for quick, easy conversion to alternate type weapons as desired with the weapons stored internally or semi-submerged.

SUMMARY OF THE INVENTION

The subject invention allows for the reconfiguration of a weapons bay so that various types and sizes of weapons can be loaded, carried and launched from the bay.

The autonomous reconfigurable bay provides a high degree of flexibility for quick conversion to alternate weapon loads at remote sites with minimum support equipment.

The improved weapons bay will allow future tactical fighter aircraft to carry advanced missiles internally with less drag, at low radar cross section signature, and at sustained supersonic flight. Further, by alternating weapon loads, a high level of airplane flexibility and performance is retained.

The reconfigurable bay includes multiple folding doors that fold internally dividing the bay into more than one individual compartments. Each compartment includes a weapons eject launcher for securing the weapon in the compartment and extending the weapon outwardly prior to launch from the aircraft. Further, each compartment can be adapted to hold different sizes and types of missiles internally with the doors in a closed position or with the doors in an open folded position and the weapons semi-submerged therein. Also, the internally folding doors, when in an open position, enable easy access to the weapons and, by being fully internal, generate little aerodynamic drag and smaller loads on supporting mechanisms in the bay.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a typical tactical fighter aircraft with the subject autonomous reconfigurable bay in the belly of the aircraft's fuselage.

FIG. 2 and FIG. 3 illustrate a front sectional view of the bay.

FIG. 4 illustrates the use of a linkage launcher for ejecting a missile from the bay.

FIG. 5A through FIG. 5F show six different types of missiles that can be housed and carried in the reconfigurable bay.

DETAILED DESCRIPTION OF THE DRAWINGS

Figure 6A:
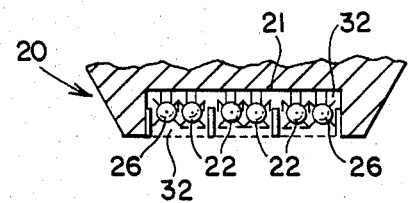
FIG. 6A through FIG. 6J illustrates the various combination of the different missiles stored in the compartments of the bay.
Figure 6B:
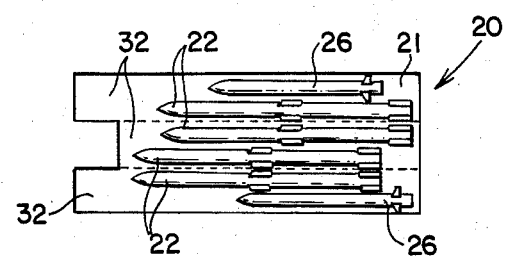
Figure 6C:
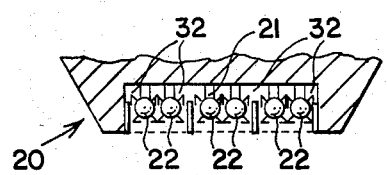
Figure 6D:
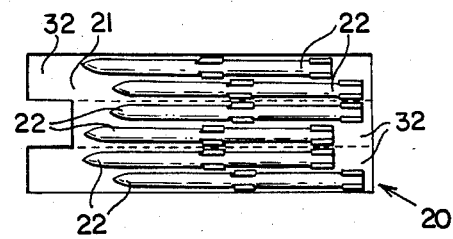
Figure 6E:
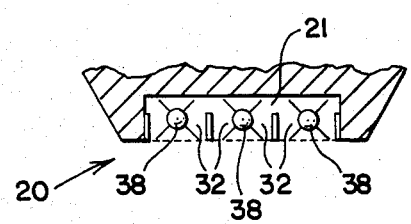
Figure 6F:
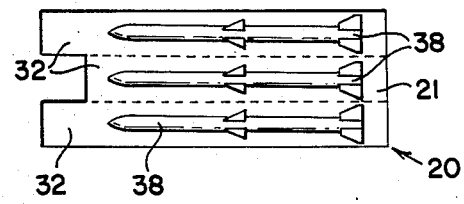
Figure 6G:
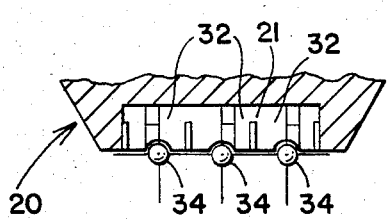
Figure 6H:
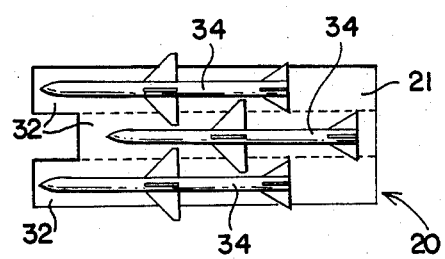

In FIG. 1 a typical tactical fighter aircraft 10 is shown having wings 12, tail section 14, a fuselage 16 with a belly 18 having the subject autonomous internal shallow weapons bay 20 therein. A front cross sectional view of the bay 20 having a bay housing 21 is shown in FIG. 2 with a fold fin AMRAAM air-to-air missile 22 lowered into an eject position by a linkage launcher 24. While the linkage launcher 24 is shown in the drawings, it should be appreciated that piston launchers and other types of launchers can be used equally well in the internal bay 20. The launcher 24 is easily removable and adjustable laterally and longitudinally as may be required for weapons of different geometries.

In FIG. 3, an enlarged front sectional view of the bay 20 is shown illustrating the internal loading and carrying of a combination of 4 AMRAAM fold fin missiles 22 and two ASRAAM fix fin missiles 26. The storage of these missiles can be seen clearly in FIGS. 6A and 6B. The bay 20 as shown in FIG. 3 can be seen with six internal folding doors 28 with door linkage assemblies 30 attached to the doors 28 and the top of the bay housing 21 for moving the doors 28 inwardly from a closed horizontal position into an open vertical position. The two doors 28 on the right are shown in an open position for loading or ejecting the missile 22 from the launcher 24. The doors 28 by folding internally as shown divide the housing 21 into individual compartments 32 with the doors 28 received between adjacent missiles. Through the use of the internally folding doors 28 to provide the compartments 32, the bay 20 can be quickly adapted for carrying a multitude of different missiles as shown in FIGS. 5 and 6. Further, the doors in an open position enable easy access to the weapons and by being fully internal generate little aerodynamic drag and small loads on supporting mechanisms as opposed to prior large bay doors which move outwardly from the bay when ejecting weapons therefrom.

FIG. 4 shows and AIM-7 sparrow missile 34 released from an adapter 36 attached to the linkage launcher 24.

The following figures show typical missiles that can be carried in combination in the bay's compartments 32. FIG. 5A shows the AMRAAM, folding fin, air-to-air, lock-on after launch missile 22. FIG. 5B shown an AIM-120, fixed-fin AMRAAM, air-to-air, lock-on after launch missile 38. FIG. 5C shows an AIM-7 sparrow, air-to-air, lock-on after launch missile 34. FIG. 5D shows an ASRAAM air-to-air, lock-on after launch missile 26. FIG. 5E shows an AIM-9, sidewinder, air-to-air, lock-on before launch missile 40. The last missile in this description is a tactical munitions dispenser (TMD) air-to-ground weapon 42. FIGS. 6A through 6J illustrate various combinations of the above missiles and how they are carried in the compartments 32 of the reconfigurable bay 20.

Figure 6I:
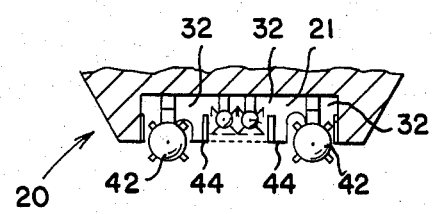
Figure 6J:
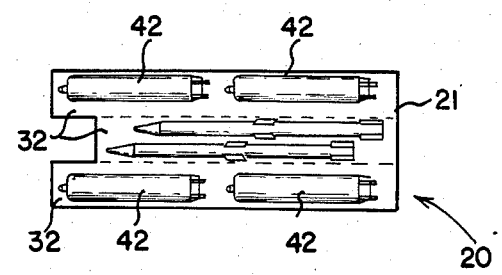
Figure 7:
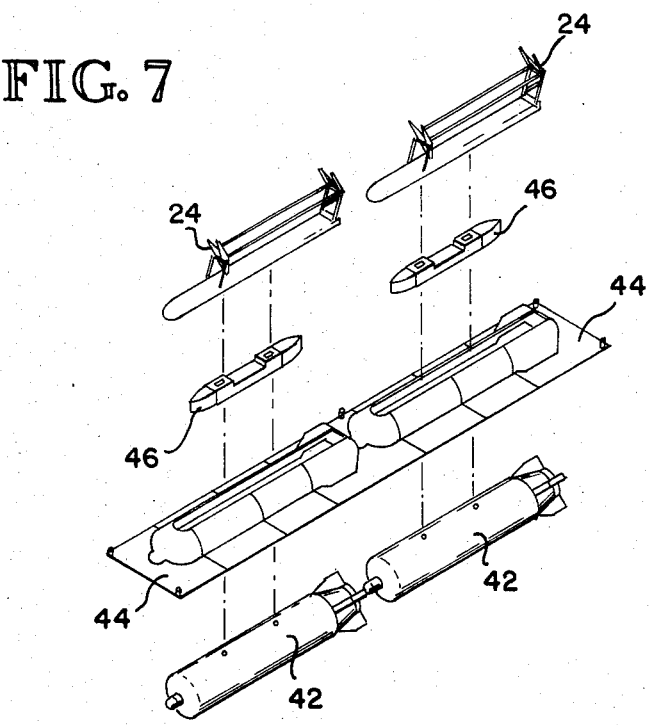
FIG. 7 illustrates the linkage launcher and contoured pan for a semi-submerged storage of an air-to-ground weapon.

In FIG. 7 an example is shown of the use of a contoured conformal pan 44 with adapters 46 attached to the linkage launcher 24 and a pair of TMD weapons 42. Because of the size and shape of these weapons, the doors 28 are raised in an open position and the pan 44 is secured to the doors 28 and a side of the bay housing 21 as shown in FIGS. 6I and 6J. This combination of structure allows a portion of the housing 21 to provide a semi-submerged carriage of the weapons 42 prior to launch.

Figure 8:
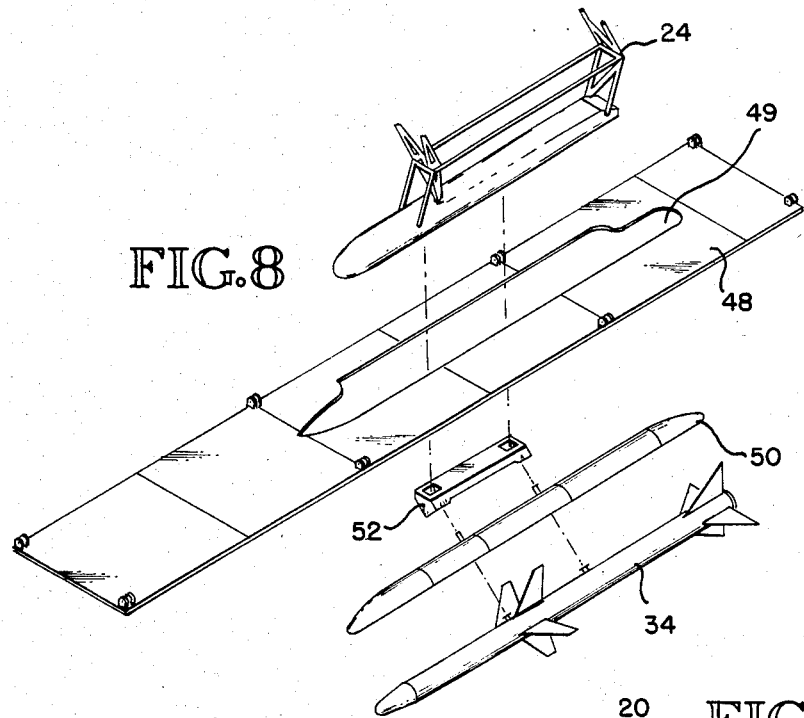
FIG. 8 illustrates the use of quick connect weapon bay cover with a rail-launched missile.

FIG. 8 illustrates the use of a flat weapons bay cover 48 with opening 49 for quick connect to the open doors 28 and the side of the housing 21 for receiving a launch rail 50 therethrough. The rail 50 is connected to an adapter 52 which is attached to the linkage launcher 24. The AIM-7 missile 34 is typically rail launched and is shown stored in the three compartments 32 of the housing 21 in FIG. 6G and FIG. 6H.

Figure 9:
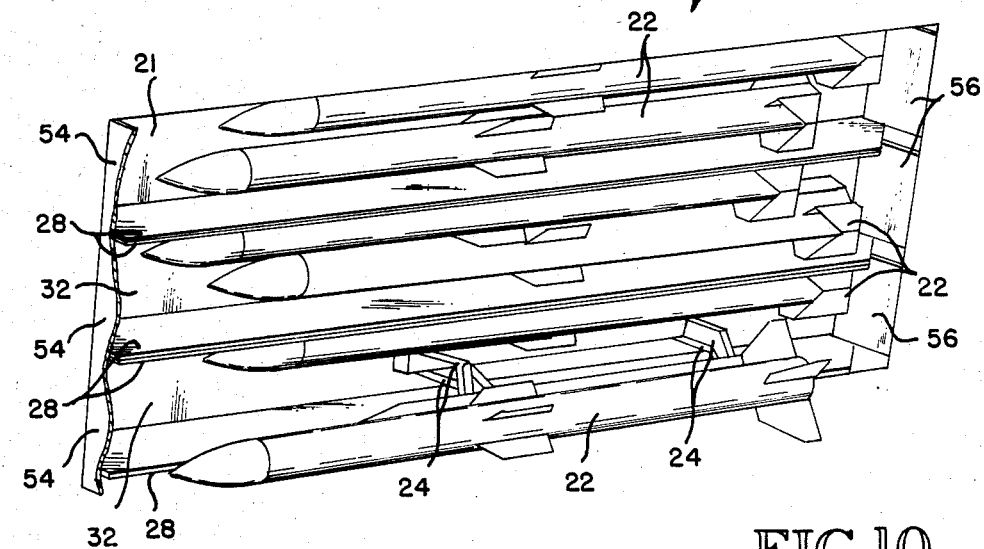
FIG. 9 and FIG. 10 illustrate the use of flow spoilers and flow ramps used in the weapons bay.
Figure 10:
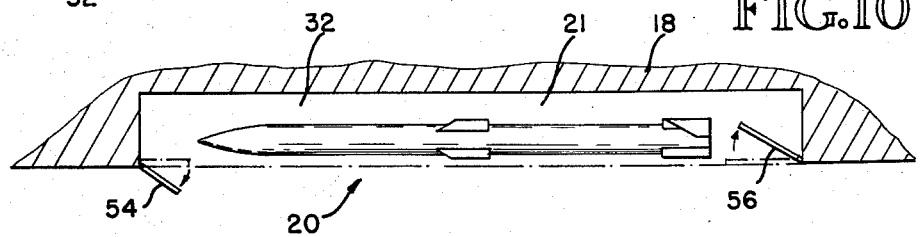

FIGS. 9 and 10 illustrate the use of air flow spoilers 54 and air flow control ramps 56. When the doors 28 are moved into an open position as shown in FIG. 9, the flow spoiler is lowered into the air stream at the forward end of the housing 21 as shown in FIG. 10. Also, at this time, the control ramp is raised into a position upwardly at an angle inside the compartment 32 at the aft end of the housing 21. The use of the deployed spoilers 54 and control ramps 56 greatly improve the aeroacoustic environment when the doors 28 are in a raised open position for ejecting a missile.

Changes may be made in the construction and arrangement of the parts or elements of the embodiments as described herein without departing from the spirit of scope of the invention defined in the following claims.

What is claimed is:

1. An aircraft internal weapons bay, the bay reconfigurable for loading, carrying and launching different types of weapons, such as air-to-air and air-to-ground weapons, the bay comprising:
   a bay housing for receiving weapons therein;
   a plurality of folding doors attached to the housing, the doors when in an open position being received entirely inside the housing and dividing the housing along its length into individual compartments, said doors, when in a closed position, enclosing said housing and allowing free access between adjacent individual compartments so that said individual compartments form a single unitary compartment; and
   a plurality of launchers attached to the bay housing and positioned in respective individual compartments, said launchers ejecting any weapons carried by said launchers from said individual compartments when the doors are opened.

2. The bay as described in claim 1 further including a conformal pan attached to a side of the bay housing and an open door for holding a portion of a weapon in a semi-submerged position in an individual compartment.

3. The bay as described in claim 1 further including an air flow spoiler mounted in a forward end of the bay housing and lowered into the air stream when the folding doors are moved into an open position.

4. The bay as described in claim 1 further including an air flow control ramp mounted in an aft end of the bay housing and raised upwardly at an angle in the housing when the folding doors are moved into an open position.

5. An aircraft internal weapons bay, the bay reconfigurable for loading, carrying and launching different types of weapons, such as air-to-air and air-to-ground missiles, the bay comprising:
   a shallow bay housing for receiving weapons therein;
   a plurality of elongated folding doors attached to the housing and disposed in a vertical open position entirely inside the housing and dividing the housing along its length and into individual compartments for receiving and storing one or more weapons, said doors, when closed, being disposed in a horizontal position enclosing said bay housing and allowing free access between adjacent individual compartments so that said individual compartments form a single unitary compartment; and
   a plurality of launch means attached to the bay housing and each individual weapon stored in the individual compartments for lowering the weapon from the compartment when the doors are opened and for ejecting the weapon from the weapons bay.

6. The bay as described in claim 5 further including a conformal pan attached to a side of the bay housing and an open door for holding a portion of a weapon in a semi-submerged position in an individual compartment.

7. The bay as described in claim 5 further including air flow spoilers mounted in a forward end of the bay housing and lowered into the air stream when the folding doors are moved into an open position forming the individual compartments.

8. The bay as described in claim 5 further including air flow control ramps mounted in an aft end of the bay housing and raised upwardly at an angle in the housing when the folding doors are moved into an open position forming the individual compartments.

9. An aircraft internal weapons bay, the bay reconfigurable for loading, carrying and launching different types of weapons, such as air-to-air and air-to-ground weapons, the bay comprising:
   a bay housing for receiving weapons therein;
   a plurality of folding doors attached to the housing, the doors when in an open position being received entirely inside the housing and dividing the housing along its length into individual compartments, said doors, when in a closed position, enclosing said housing and allowing free access between adjacent individual compartments so that said individual compartments form a single unitary compartment;
   a plurality of launchers attached to the bay housing and positioned in respective individual compartments, said launchers ejecting any weapons carried by said launchers from said individual compartments when the doors are opened;
   a conformed pan enclosing said bay housing for holding a portion of each of said weapons in a semi-submerged position in respective individual compartments.

* * * * *